(12) United States Patent
Ward

(10) Patent No.: US 11,214,923 B2
(45) Date of Patent: Jan. 4, 2022

(54) MULTI-LAYER PAPERMAKER'S FORMING FABRIC WITH AUXILIARY BOTTOM MD YARNS

(71) Applicant: Huyck Licensco Inc., Youngsville, NC (US)

(72) Inventor: Kevin Ward, Coldbrook (CA)

(73) Assignee: Huyck Licensco Inc., Youngsville, NC (US)

(*) Notice: Subject to any disclaimer, the term of this patent is extended or adjusted under 35 U.S.C. 154(b) by 0 days.

(21) Appl. No.: 17/018,646

(22) Filed: Sep. 11, 2020

(65) Prior Publication Data

US 2021/0032814 A1    Feb. 4, 2021

Related U.S. Application Data

(62) Division of application No. 16/268,932, filed on Feb. 6, 2019, now Pat. No. 10,808,358.

(Continued)

(51) Int. Cl.
*D21F 7/08* (2006.01)
*D03D 3/04* (2006.01)
(Continued)

(52) U.S. Cl.
CPC .......... *D21F 1/0045* (2013.01); *B32B 5/024* (2013.01); *B32B 5/26* (2013.01); *B32B 7/09* (2019.01);
(Continued)

(58) Field of Classification Search
CPC .............. D21F 1/0045; D21F 1/0036; Y10T 442/3179; Y10T 442/3195; Y10S 162/90; Y10S 162/903; D03D 13/00; D03D 3/04
See application file for complete search history.

(56) References Cited

U.S. PATENT DOCUMENTS 4,423,755 A    1/1984    Thompson
4,501,303 A    2/1985    Oesterberg
(Continued)

FOREIGN PATENT DOCUMENTS

EP    1158089 A2    11/2001
EP    0961853    6/2002
(Continued)

OTHER PUBLICATIONS

"Examination Report corresponding to Australian Application No. 2019217354 dated Feb. 23, 2021".
(Continued)

*Primary Examiner* — Robert H Muromoto, Jr.
(74) *Attorney, Agent, or Firm* — Myers Bigel, P.A.

(57) ABSTRACT

A papermaker's fabric includes a series of repeat units, wherein each of the repeat units includes: a set of top machine direction MD yarns having a first diameter; a set of bottom MD yarns having a second diameter larger than the first diameter; a set of auxiliary bottom MD yarns having the first diameter; a set of top cross machine direction CMD yarns interwoven with the top MD yarns to form a top fabric layer; a set of bottom CMD yarns interwoven with the bottom MD yarns and the auxiliary bottom MD yarns to form a bottom fabric layer; and a set of stitching yarns arranged in pairs, wherein at least one of the stitching yarns of the pair interweaves with the top and bottom fabric layers.

9 Claims, 6 Drawing Sheets

Related U.S. Application Data

(60) Provisional application No. 62/629,348, filed on Feb. 12, 2018.

(51) Int. Cl.
    *D21F 1/10* (2006.01)
    *D21F 1/00* (2006.01)
    *B32B 7/09* (2019.01)
    *B32B 5/02* (2006.01)
    *B32B 5/26* (2006.01)
    *D03D 1/00* (2006.01)
    *D03D 11/00* (2006.01)
    *D03D 25/00* (2006.01)

(52) U.S. Cl.
    CPC ............... *D03D 1/00* (2013.01); *D03D 3/04* (2013.01); *D03D 11/00* (2013.01); *D21F 1/0036* (2013.01); *D21F 1/105* (2013.01); *D21F 7/083* (2013.01); *B32B 2413/00* (2013.01); *B32B 2433/00* (2013.01)

(56) References Cited

U.S. PATENT DOCUMENTS

| | | | |
|---|---|---|---|
| 5,152,326 A | 10/1992 | Vohringer | |
| 5,437,315 A | 8/1995 | Ward | |
| 5,967,195 A | 10/1999 | Ward | |
| 6,179,013 B1 | 1/2001 | Gulya | |
| 6,244,306 B1 * | 6/2001 | Troughton | D21F 1/0045 139/383 A |
| 6,253,796 B1 * | 7/2001 | Wilson | D21F 1/0045 139/383 A |
| 6,745,797 B2 | 6/2004 | Troughton | |
| 6,837,277 B2 * | 1/2005 | Troughton | D21F 1/0045 139/383 A |
| 6,896,009 B2 | 5/2005 | Ward | |
| 7,059,357 B2 * | 6/2006 | Ward | D21F 1/0045 139/348 |
| 7,195,040 B2 * | 3/2007 | Ward | D21F 1/0036 139/383 A |
| 7,219,701 B2 * | 5/2007 | Ward | D21F 1/0036 139/383 A |
| RE40,066 E * | 2/2008 | Ward | D21F 1/0045 139/383 A |
| 7,441,566 B2 * | 10/2008 | Ward | D21F 1/0045 139/383 A |
| 7,624,766 B2 * | 12/2009 | Ward | D21F 1/0036 139/383 A |
| 7,931,051 B2 | 4/2011 | Ward et al. | |
| 8,196,613 B2 * | 6/2012 | Ward | D21F 1/0036 139/383 A |
| 8,251,103 B2 | 8/2012 | Baumann | |
| 2003/0024590 A1 | 2/2003 | Stone | |
| 2004/0149342 A1 * | 8/2004 | Troughton | D21F 1/0045 139/383 R |
| 2004/0182464 A1 * | 9/2004 | Ward | D21F 1/0045 139/383 A |
| 2004/0182465 A1 * | 9/2004 | Ward | D21F 1/0045 139/383 A |
| 2005/0121097 A1 * | 6/2005 | Ward | D21F 1/0045 139/383 A |
| 2006/0185753 A1 * | 8/2006 | Ward | D21F 1/0036 139/383 A |
| 2007/0068591 A1 * | 3/2007 | Ward | D21F 1/0036 139/383 A |
| 2007/0157987 A1 * | 7/2007 | Ward | D21F 1/0045 139/383 A |
| 2008/0223474 A1 * | 9/2008 | Ward | D21F 1/0036 139/420 B |
| 2011/0036527 A1 * | 2/2011 | Ward | D21F 1/0036 162/289 |
| 2019/0249365 A1 * | 8/2019 | Ward | D03D 11/00 |

FOREIGN PATENT DOCUMENTS

| | | |
|---|---|---|
| JP | 2006057217 A | 3/2006 |
| JP | 2007092268 A | 4/2007 |
| JP | 2012507639 A | 3/2012 |
| JP | 2015017340 A | 1/2015 |
| KR | 1020110103464 | 9/2011 |

OTHER PUBLICATIONS

International Preliminary Report on Patentability corresponding to International Application No. PCT/US2019/016463 dated Aug. 27, 2020.

International Search Report and Written Opinion corresponding to International Application No. PCT/US2019/016463 dated May 7, 2019.

"Extended European Search Report corresponding to European Application No. 19751104.1 dated Jul. 5, 2021".

"Third-Party Observation corresponding to Japanese Application No. 2020-543062 submitted Jun. 15, 2021".

"Office Action corresponding to Japanese Application No. 2020-543062 dated Sep. 7, 2021".

* cited by examiner

MULTI-LAYER PAPERMAKER'S FORMING FABRIC WITH AUXILIARY BOTTOM MD YARNS

RELATED APPLICATIONS

This application is a divisional of U.S. patent application Ser. No. 16/268,932, filed Feb. 6, 2019, which claims priority from and the benefit of U.S. Provisional Patent Application No. 62/629,348, filed Feb. 12, 2018. The disclosures of these prior applications are hereby incorporated herein by reference in full.

FIELD OF THE INVENTION

This application is directed generally to papermaking, and more specifically to fabrics employed in papermaking.

BACKGROUND OF THE INVENTION

In the conventional fourdrinier papermaking process, a water slurry, or suspension, of cellulosic fibers (known as the paper "stock") is fed onto the top of the upper run of an endless belt of woven wire and/or synthetic material that travels between two or more rolls. The belt, often referred to as a "forming fabric," provides a papermaking surface on the upper surface of its upper run that operates as a filter to separate the cellulosic fibers of the paper stock from the aqueous medium, thereby forming a wet paper web. The aqueous medium drains through mesh openings of the forming fabric, known as drainage holes, by gravity or vacuum located on the lower surface of the upper run (i.e., the "machine side") of the fabric.

After leaving the forming section, the paper web is transferred to a press section of the paper machine, where it is passed through the nips of one or more pairs of pressure rollers covered with another fabric, typically referred to as a "press felt." Pressure from the rollers removes additional moisture from the web; the moisture removal is enhanced by the presence of a "batt" layer of the press felt. The paper is then transferred to a dryer section for further moisture removal. After drying, the paper is ready for secondary processing and packaging.

As used herein, the terms machine direction ("MD") and cross machine direction ("CMD") refer, respectively, to a direction aligned with the direction of travel of the papermakers' fabric on the papermaking machine, and a direction parallel to the fabric surface and traverse to the direction of travel. Likewise, directional references to the vertical relationship of the yarns in the fabric (e.g., above, below, top, bottom, beneath, etc.) assume that the papermaking surface of the fabric is the top of the fabric and the machine side surface of the fabric is the bottom of the fabric.

Typically, papermaker's fabrics are manufactured as endless belts by one of two basic weaving techniques. In the first of these techniques, fabrics are flat woven by a flat weaving process, with their ends being joined to form an endless belt by any one of a number of well-known joining methods, such as dismantling and reweaving the ends together (commonly known as splicing), or sewing on a pin-seamable flap or a special foldback on each end, then reweaving these into pin-seamable loops. A number of auto joining machines are now commercially available, which for certain fabrics may be used to automate at least part of the joining process. In a flat woven papermaker's fabric, the warp yarns extend in the machine direction and the filling yarns extend in the cross machine direction.

In the second basic weaving technique, fabrics are woven directly in the form of a continuous belt with an endless weaving process. In the endless weaving process, the warp yarns extend in the cross machine direction and the filling yarns extend in the machine direction. Both weaving methods described hereinabove are well known in the art, and the term "endless belt" as used herein refers to belts made by either method.

Effective sheet and fiber support are important considerations in papermaking, especially for the forming section of the papermaking machine, where the wet web is initially formed. Additionally, the forming fabrics should exhibit good stability when they are run at high speeds on the papermaking machines, and preferably are highly permeable to reduce the amount of water retained in the web when it is transferred to the press section of the paper machine. In both tissue and fine paper applications (i.e., paper for use in quality printing, carbonizing, cigarettes, electrical condensers, and like) the papermaking surface comprises a very finely woven or fine wire mesh structure.

Typically, finely woven fabrics such as those used in fine paper and tissue applications include at least some relatively small diameter machine direction or cross machine direction yarns. Regrettably, however, such yarns tend to be delicate, leading to a short surface life for the fabric. Moreover, the use of smaller yarns can also adversely affect the mechanical stability of the fabric (especially in terms of stretch resistance, skew resistance, narrowing propensity and stiffness), which may negatively impact both the service life and the performance of the fabric.

To combat these problems associated with fine weave fabrics, multi-layer forming fabrics have been developed with fine-mesh yarns on the paper forming surface to facilitate paper formation and coarser-mesh yarns on the machine contact side to provide strength and durability. For example, fabrics have been constructed which employ one set of machine direction yarns which interweave with two sets of cross machine direction yarns to form a fabric having a fine paper forming surface and a more durable machine side surface. These fabrics form part of a class of fabrics which are generally referred to as "double layer" fabrics. Similarly, fabrics have been constructed which include two sets of machine direction yarns and two sets of cross machine direction yarns that form a fine mesh paperside fabric layer and a separate, coarser machine side fabric layer. In these fabrics, which are part of a class of fabrics generally referred to as "triple layer" fabrics, in the past the two fabric layers were typically bound together by separate stitching yarns. However, today are more often bound together using yarns from one or more of the sets of bottom and top cross machine direction and machine direction yarns. As double and triple layer fabrics include additional sets of yarn as compared to single layer fabrics, these fabrics typically have a higher "caliper" (i.e., they are thicker) than comparable single layer fabrics. An illustrative double layer fabric is shown in U.S. Pat. No. 4,423,755 to Thompson, and illustrative triple layer fabrics are shown in U.S. Pat. No. 4,501,303 to Osterberg, U.S. Pat. No. 5,152,326 to Vohringer, U.S. Pat. Nos. 5,437,315 and 5,967,195 to Ward, and U.S. Pat. No. 6,745,797 to Troughton.

U.S. Pat. No. 5,967,195 to Ward discloses a triple layer fabric in which pairs of stitching yarns extend in the cross machine direction and form part of the papermaking surface, in essence "completing the weave" of the papermaking surface, while also stitching with the bottom layer. The fabrics disclosed in Ward have the same number of top machine direction yarns and bottom machine direction yarns. Such fabrics have proven to provide an excellent papermaking surface (particularly due to the integration of the stitching yarns into the weave of the papermaking surface) and to combat inter-layer wear. U.S. Pat. No. 6,896,009 shows a similar concept with MD stitching yarns.

Efficient drainage of water from a forming fabric can be an issue in papermaking. One solution for efficient drainage is proposed in co-assigned U.S. Pat. No. 8,251,103 to Baumann, the disclosure of which is hereby incorporated herein by reference. Baumann describes the use of engineered channels formed by the interstices in the fabric to provide efficient drainage; the patent proposes the use of a calculated "drainage factor" and a "channel factor" to improve drainage efficiency. It would be desirable to provide additional fabrics that expand on this concept.

SUMMARY

As a first aspect, embodiments of the invention are directed to a papermaker's fabric comprising a series of repeat units, wherein each of the repeat units comprises: a set of top MD yarns having a first diameter; a set of bottom MD yarns having a second diameter larger than the first diameter; a set of auxiliary bottom MD yarns having the first diameter; a set of top CMD yarns interwoven with the top MD yarns to form a top fabric layer; a set of bottom CMD yarns interwoven with the bottom MD yarns and the auxiliary bottom MD yarns to form a bottom fabric layer; and a set of stitching yarns arranged in pairs, wherein at least one of the stitching yarns of the pair interweaves with the top and bottom fabric layers.

As a second aspect, embodiments of the invention are directed to a papermaker's fabric comprising a series of repeat units, wherein each of the repeat units comprises: a set of top MD yarns; a set of bottom MD yarns; a set of auxiliary bottom MD yarns; a set of top CMD yarns interwoven with the top MD yarns to form a top fabric layer; a set of bottom CMD yarns interwoven with the bottom MD yarns and the auxiliary bottom MD yarns to form a bottom fabric layer; and a set of stitching yarns arranged in pairs, wherein at least one of the stitching yarns of the pair interweaves with the top and bottom fabric layers. Each of the auxiliary bottom MD yarns follows the same weaving sequence with the bottom CMD yarns as an adjacent bottom MD yarn.

As a third aspect, embodiments of the invention are directed to a papermaker's fabric comprising a series of repeat units. Each of the repeat units comprises: a set of top MD yarns; a set of bottom MD yarns; a set of auxiliary bottom MD yarns; a set of top CMD yarns interwoven with the top MD yarns to form a top fabric layer; a set of bottom CMD yarns interwoven with the bottom MD yarns and the auxiliary bottom MD yarns to form a bottom fabric layer; and a set of stitching yarns arranged in pairs, wherein at least one of the stitching yarns of the pair interweaves with the top and bottom fabric layers. Each of the auxiliary bottom MD yarns is interwoven with the bottom CMD yarns such that it forms a knuckle under bottom CMD yarns under which the adjacent bottom MD yarns also form knuckles.

DETAILED DESCRIPTION

Figure 1:
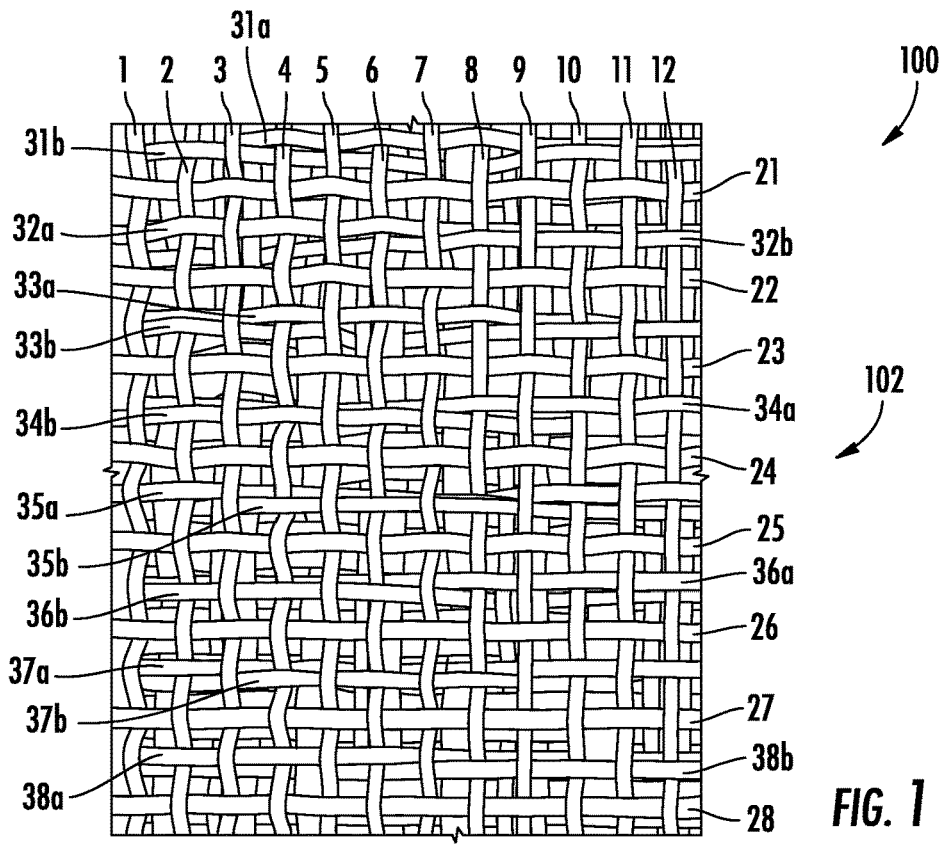
FIG. 1 is a top view of a repeat unit of a papermaking forming fabric according to embodiments of the invention.

The present invention will now be described more fully hereinafter, in which embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. The device may be otherwise oriented (rotated 90 degrees or at other orientations) and the spatially relative descriptors used herein interpreted accordingly.

Well-known functions or constructions may not be described in detail for brevity and/or clarity.

Figure 2:
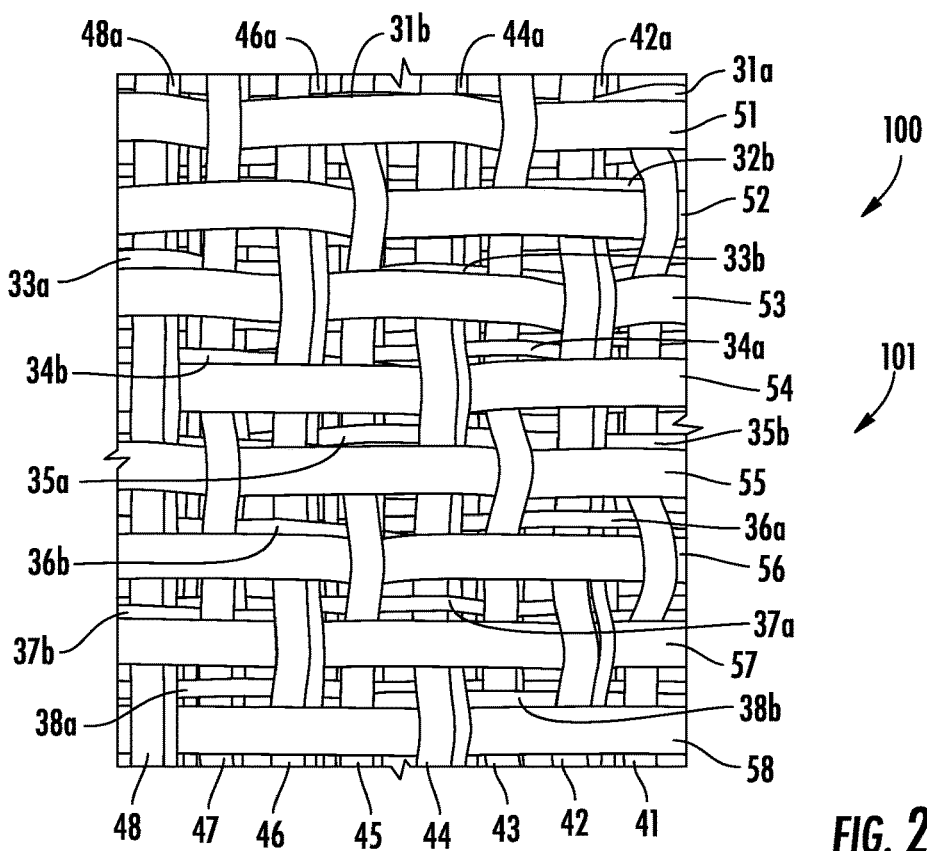
FIG. 2 is a bottom view of the fabric of FIG. 1.

Referring now to the figures, a repeat unit of a papermaking forming fabric, designated broadly at 100, is shown in FIGS. 1-5. FIG. 1 shows the paper side or "top" side of the fabric 100, and FIG. 2 shows the machine side of the fabric 100 (i.e., the side facing the papermaking machine, referred to herein also as the "bottom" side of the fabric 100).

FIG. 1 illustrates the top layer 102 of the fabric 100, which includes twelve top MD yarns 1-12, eight top CMD yarns 21-28, and eight stitching yarn pairs 31*a*, 31*b*-38*a*, 38*b*, with a stitching yarn pair being located between adjacent top CMD yarns. The top MD yarns 1-12, top CMD yarns 21-28 and stitching yarn pairs 31*a*, 31*b*-38*a*, 38*b* are interwoven to form a plain weave surface on the top layer 102.

Figure 3:
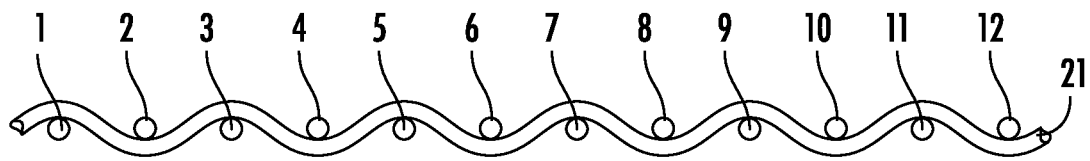
FIG. 3 is a section view of a typical top CMD yarn of the fabric of FIG. 1.

As can be seen in FIGS. 1 and 3, a typical top CMD yarn, such as top CMD yarn 21, follows an "over 1/under 1" sequence as it weaves with the top MD yarns 1-12. More specifically, top CMD yarn 21 passes over top MD yarns 1, 3, 5, 7, 9 and 11 and under top MD yarns 2, 4, 6, 8, 10 and 12. Each of the other top CMD yarns 22-28 follows the same sequence.

Figure 4:
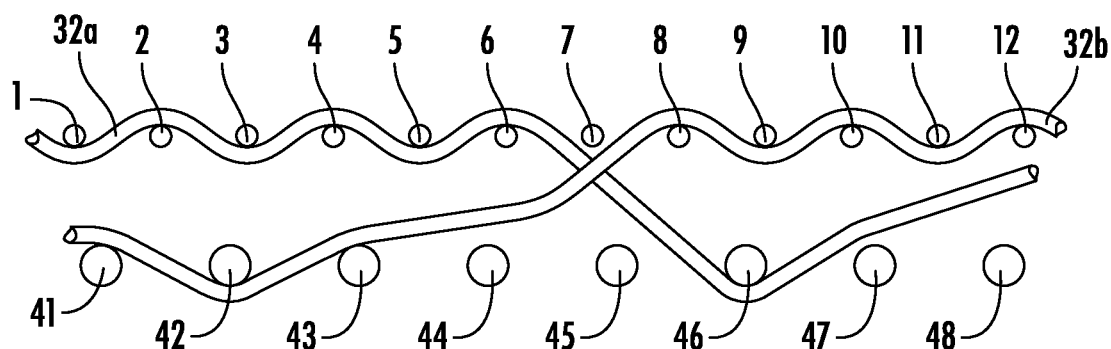
FIG. 4 is a section view of a typical pair of stitching yarns of the fabric of FIG. 1.

As can be seen in FIGS. 1 and 4, corresponding pairs of stitching yarns 31*a*, 31*b*-38*a*, 38*b* interweave with the top MD yarns and bottom MD yarns in the following pattern. Each of the stitching yarns of the repeat unit can be subdivided into two portions: a fiber support portion which interweaves with the top MD yarns, and a binding portion which passes below the top MD yarns and, in the illustrated embodiment, interweaves with a bottom MD yarn. These are separated at "transitional" top MD yarns, below which one stitching yarn of a pair crosses the other stitching yarn of the pair. The stitching yarns of each pair are interwoven relative to one another such that the fiber support portion of one yarn of the pair is positioned above the binding portion of the other yarn of the pair. The fiber support portion of one stitching yarn of each pair interweaves in an alternating fashion with five top MD yarns (alternately passing over three top MD yarns and under two top MD yarns), and the fiber support portion of the other yarn of the pair passes over three other top MD yarns of the repeat unit while passing below two other top MD yarns positioned between those three top MD yarns. Both of the stitching yarns pass below the transitional top MD yarns. Thus, together the stitching yarns of each pair pass over six top MD yarns and under six top MD yarns in an "over 1/under 1" pattern similar to that of the top CMD yarns.

As exemplified in FIG. 4 by stitching yarn pair 32*a*, 32*b*, each stitching yarn interweaves with five top MD yarns (passing in alternating fashion over three top MD yarns and under two top MD yarns) and passes under one bottom MD yarn. For example, stitching yarn 32*a* passes over top MD yarns 2, 4 and 6 and under top MD yarns 3 and 5 (and also passes under bottom MD yarn 46, as discussed below), while stitching yarn 32*b* passes over top MD yarns 8, 10 and 12 and under bottom MD yarns 9 and 11. Thus, together the stitching yarns 32*a*, 32*b* (and each other pair of stitching yarns) form the equivalent of one top CMD yarn that weaves in the "over 1/under 1" sequence followed by the top CMD yarns. As a result, together the top MD yarns 1-12, the top CMD yarns 21-28, and the portions of the stitching yarns 31*a*, 31*b*-38*a*, 38*b* that weave with the top MD yarns form a plain weave surface for the top layer 102. Such top surface constructions are well-known (exemplified in, for example, U.S. Pat. No. 5,967,195 to Ward, the disclosure of which is hereby incorporated herein) and need not be described in detail herein.

Referring now to FIG. 2, the machine side of the fabric 100 includes eight bottom MD yarns 41-48, four auxiliary bottom MD yarns 42*a*, 44*a*, 46*a*, 48*a*, and eight bottom CMD yarns 51-58 that form a bottom layer 101. By way of explanation, the auxiliary bottom MID yarns 42*a*, 44*a*, 46*a*, 48*a* (which are similar in size to the top MD yarns 1-12 and therefore are smaller than the bottom MD yarns 41-48) are each paired with a respective bottom MD yarn 42, 44, 46, 48 and weave in the same pattern as that paired yarn. The bottom MD yarns 41-48 and the auxiliary bottom MD yarns 42*a*, 44*a*, 46*a*, 48*a* are interwoven with the bottom CMD yarns 51-58 in an "over 3/under 1/over3/under 1" sequence (for reference purposes, herein the terms "over" and "under" are used with respect to the paper side of the fabric 10 being "up" and the machine side being "down", as is shown in FIGS. 1 and 3-5, with the understanding that in the bottom view of FIG. 2, yarns seen as passing "over" other yarns actually pass "under" those yarns with the paper side chosen as being "up"). For example, bottom MD yarn 44 passes over bottom CMD yarns 51-53, under bottom CMD yarn 54, over bottom CMD yarns 55-57 and under bottom CMD yarn 58. The auxiliary bottom MD yarns 42*a*, 44*a*, 46*a*, 48*a* weave identically to bottom MD yarns 42, 44, 46, 48 respectively.

Figure 5:
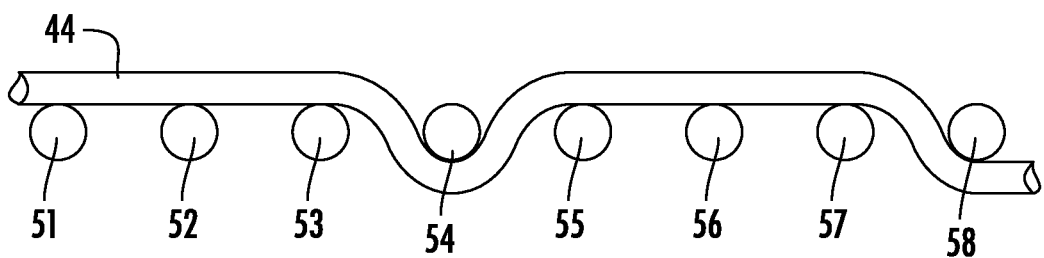
FIG. 5 is a section view of a typical bottom MD yarn of the fabric of FIG. 1.

Referring now to FIGS. 2 and 5, each bottom MD yarn is offset from its immediate bottom MID yarn neighbors to create a 4-harness broken twill pattern on the bottom surface with the "knuckles" formed by the bottom MD yarns. For example, bottom MD yarn 41 passes under bottom CMD yarns 52 and 56, bottom MD yarn 42 passes under bottom CMD yarns 53 and 57, bottom MD yarn 43 passes under bottom CMD yarns 51 and 55, and bottom MD yarn 44 passes under bottom CMD yarns 54 and 58. The remaining bottom MD yarns 45-48 follow a similar offset pattern (see FIG. 2).

The bottom layer 101 also includes knuckles formed by the stitching yarns 31*a*, 31*b*-38*a*, 38*b* under the bottom MD yarns 41-48 and auxiliary bottom MD yarns 42*a*, 44*a*, 46*a*, 48*a*. The knuckles form a 4-harness broken twill pattern. As examples, the stitching yarns 31*a*, 31*b* form knuckles under bottom MD yarns 41, 45, the stitching yarns 32*a*, 32*b* form knuckles under bottom MD yarns 42, 46 (as well as under auxiliary bottom MD yarns 42*a*, 46*a*), the stitching yarns 33*a*, 33*b* form knuckles under bottom MD yarns 44, 48 (as well as under auxiliary bottom MD yarns 44*a*, 48*a*), and the stitching yarns 34*a*, 34*b* form knuckles under bottom MD yarns 43, 47. A similar pattern is repeated for stitching yarns 35*a*, 35*b*-38*a*, 38*b* (see FIGS. 2 and 4).

Those skilled in this art will appreciate that, although the stitching yarns 31*a*, 31*b*-38*a*, 38*b* are woven with both stitching yarns of the pair both weaving with the top MD yarns and stitching under the bottom MD yarns, in some embodiments only one stitching yarn of the pair may stitch under the bottom MD yarns, with the other stitching yarn of the pair simply routed between the top and bottom MD yarns instead of stitching. This so-called "phantom" stitching yarn is described, for example, in U.S. Pat. No. 7,931,051 to Ward, the disclosure of which is hereby incorporated by reference herein in its entirety.

Turning now to FIGS. 6-10, a repeat unit of a forming fabric according to embodiments of the present invention, designated broadly at 200, is illustrated therein. The repeat unit 200 includes twelve top MD yarns 201-212, eight top CMD yarns 221-228, four pairs of stitching yarns 231a, 231b-234a, 234b, eight bottom MD yarns 241-248, four auxiliary bottom MID yarns 241a, 243a, 245a, 247a, and eight bottom CMD yarns 251-258. The interweaving of these yarns is described below.

Figure 6:
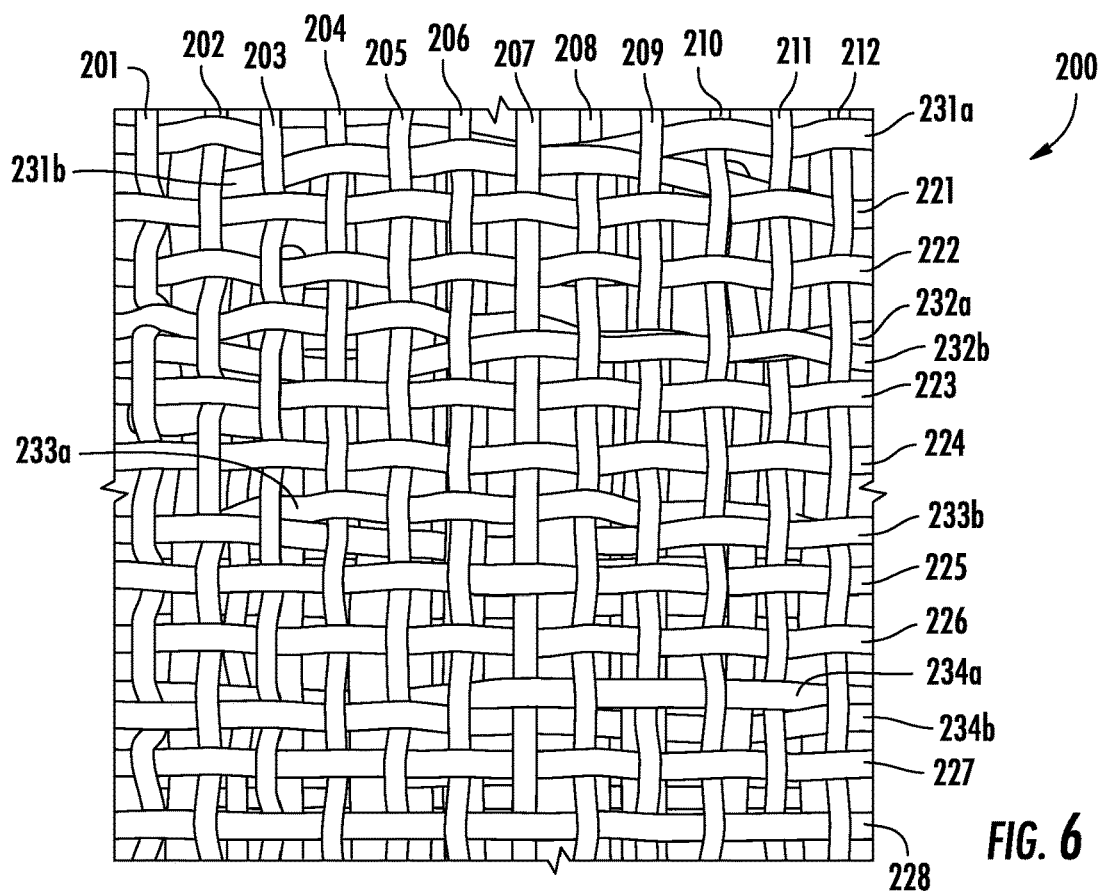
FIG. 6 is a top view of a repeat unit of a papermaking forming fabric according to embodiments of the invention.

Turning first to FIG. 6, the top surface of the fabric 200 is shown therein. The top CMD yarns 221-228 and stitching yarns 231a, 231b-234a, 234b are arranged in an alternating pattern in which two top CMD yarns are followed by a pair of stitching yarns. As exemplified in FIG. 6, top CMD yarns 221 and 222 follow stitching yarn pair 231a, 231b, then stitching yarn pair 232a, 232b follows top CMD yarn 222. This pattern of "stitching yarn pair/two top CMD yarns" continues throughout the repeat unit.

Figure 8:
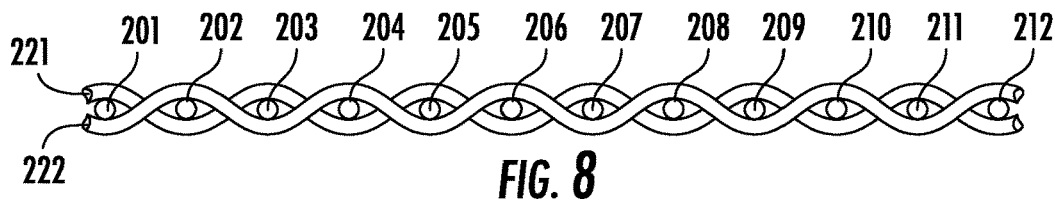
FIG. 8 is a section view of two typical top CMD yarns of the fabric of FIG. 6.

Each of the top CMD yarns 221-228 interweaves with the top MD yarns in an "over 1/under 1" sequence. Because two top CMD yarns are positioned between a pair of stitching yarns, they pass over alternating top MD yarns. This pattern is shown in FIG. 8, wherein top CMD yarn 222 is shown passing over top MD yarns 202, 204, 206, 208, 210 and 212, whereas top CMD yarn 221 is shown passing over top MD yarns 201, 203, 205, 207, 209 and 211.

Figure 9:
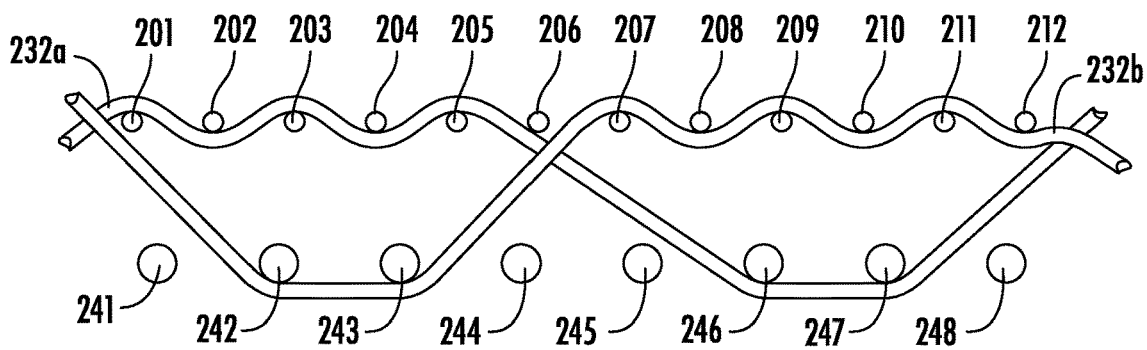
FIG. 9 is a section view of a typical pair of stitching yarns of the fabric of FIG. 6.

In its fiber support portion, each stitching yarn 231a, 231b-234a, 234b passes over top MD yarns that the adjacent top CMD yarns pass beneath and under the top MD yarns that the adjacent top CMD yarns pass over. For example, and as shown in FIG. 9, the fiber support portion of stitching yarn 232a passes over top MD yarns 201, 203 and 205 while passing under top MD yarns 202 and 204, and stitching yarn 232b passes over top MD yarns 207, 209 and 211 while passing below top MD yarns 208 and 210. Both stitching yarns 232a, 232b pass below the transitional top MD yarns 206, 212. The remaining stitching yarn pairs weave in a similar manner, although they are offset from adjacent stitching yarn pairs by three top MD yarns. In this manner, the stitching yarns 231a, 231b-234a, 234b and the top CMD yarns 221-228 form a plain weave pattern with the top MD yarns 201-212 (see FIG. 6).

Figure 7:
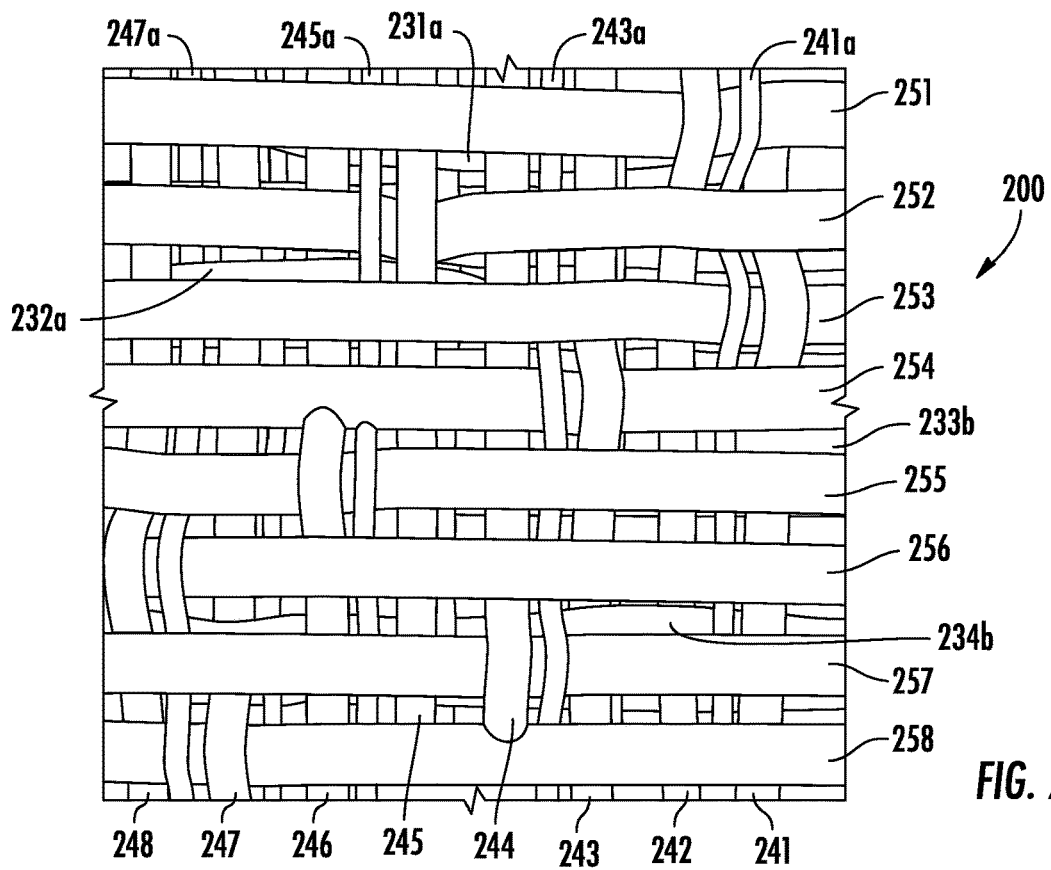
FIG. 7 is a bottom view of the fabric of FIG. 6.
Figure 10:
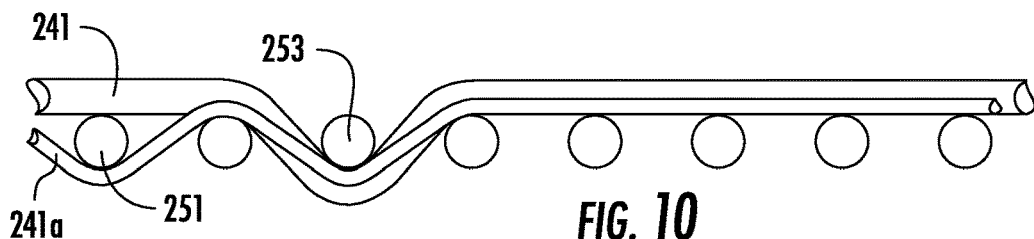
FIG. 10 is a section view of a typical bottom MD yarn and auxiliary bottom MD yarn of the fabric of FIG. 6.

Turning now to FIGS. 7 and 10, the bottom surface of the fabric is shown therein. The bottom MD yarns 241-248 interweave with the bottom CMD yarns 251-258 in an "over7/under 1" pattern (note that FIG. 7 is a bottom view of the fabric 200 and is opposite the view of FIG. 6, so the description of the bottom MD yarns passing "over 4" bottom CMD yarns is consistent with the "over" and "under" conventions adopted with respect to FIGS. 6 and 8-10 rather than the view seen in FIG. 9). For example, bottom MD yarn 241 passes over bottom CMD yarns 251 and 252, under bottom CMD yarn 253, and over bottom CMD yarns 254-258 (see FIG. 10). The remaining bottom MD yarns follow a similar pattern, with each bottom MD yarn being offset from its adjacent bottom MD yarns in a double broken twill pattern.

The auxiliary bottom MD yarns 241a, 243a, 245a, 247a are woven with the bottom CMD yarns 251-258 in either an "over 5/under 1/over 1/under 1" sequence or an "over 2/under 1/over 4/under 1" sequence. Each "under 1" knuckle of the auxiliary bottom MD yarns aligns with the "under 1" knuckles of the bottom MD yarns that sandwich that auxiliary bottom MD yarn. For example, auxiliary bottom MD yarn 241a forms knuckles under bottom CMD yarns 251, 253, which are the same bottom CMD yarns under which bottom MD yarns 241, 242 (located on either side of auxiliary bottom MD yarn 241a) form knuckles (see FIG. 10). The remaining auxiliary bottom MD yarns similarly form knuckles aligned with their neighboring bottom MD yarns.

Also, the binding portion of each of the stitching yarns 231a, 231b-234a, 234b is stitched below two bottom MD yarns, with the stitching yarns of a pair stitching below bottom MD yarns that are separated by two bottom MD yarns. For example, as shown in FIG. 9, stitching yarn 232a passes below bottom MD yarns 246 and 247, and stitching yarn 232b passes under bottom MD yarns 242, 243. Adjacent pairs of stitching yarns are offset from each other by two bottom MID yarns.

Turning now to FIGS. 11-15, a repeat unit of a forming fabric according to embodiments of the present invention, designated broadly at 300, is illustrated therein. The repeat unit 300 includes twelve top MD yarns 301-312, six top CMD yarns 321-326, four pairs of stitching yarns 331a, 331b-334a, 334b, eight bottom MD yarns 341-348, four auxiliary bottom MD yarns 342a, 344a, 346a, 348a, and four bottom CMD yarns 351-354. The interweaving of these yarns is described below.

Figure 11:
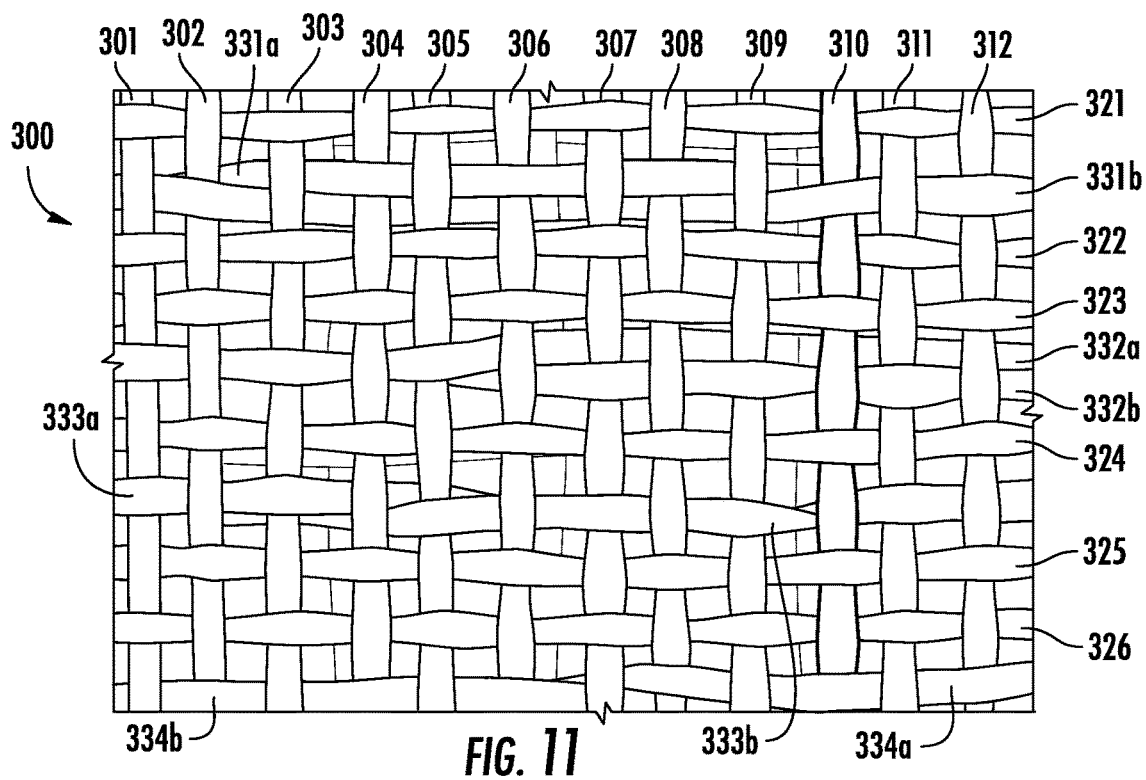
FIG. 11 is a top view of a repeat unit of a papermaking forming fabric according to embodiments of the invention.

Turning first to FIG. 11, the top surface of the fabric 300 is shown therein. The top CMD yarns 321-326 and stitching yarns 331a, 331b-334a, 334b are arranged in a pattern in which one top CMD yarn is followed by a pair of stitching yarns, then two top CMD yarns are followed by another pair of stitching yarns. As exemplified in FIG. 11, top CMD yarns 321 is followed by stitching yarn pair 331a, 331b, then two top CMD yarns 322, 323 are followed by stitching yarn pair 332a, 332b. This pattern of "one top CMD yarn/stitching yarn pair/two top CMD yarns/stitching yarn pair" continues throughout the repeat unit.

Figure 13:
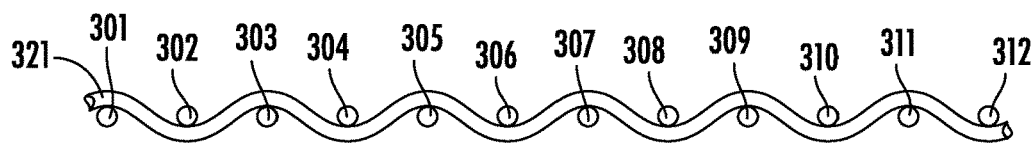
FIG. 13 is a section view of a typical top CMD yarn of the fabric of FIG. 11.

Each of the top CMD yarns 321-326 interweaves with the top MD yarns in an "over 1/under 1" sequence. This pattern is shown in FIG. 13, wherein top CMD yarn 321 is shown passing over top MD yarns 301, 303, 305, 307, 309, 311 and under top MD yarns 302, 304, 306, 308, 310 and 312.

Figure 14:
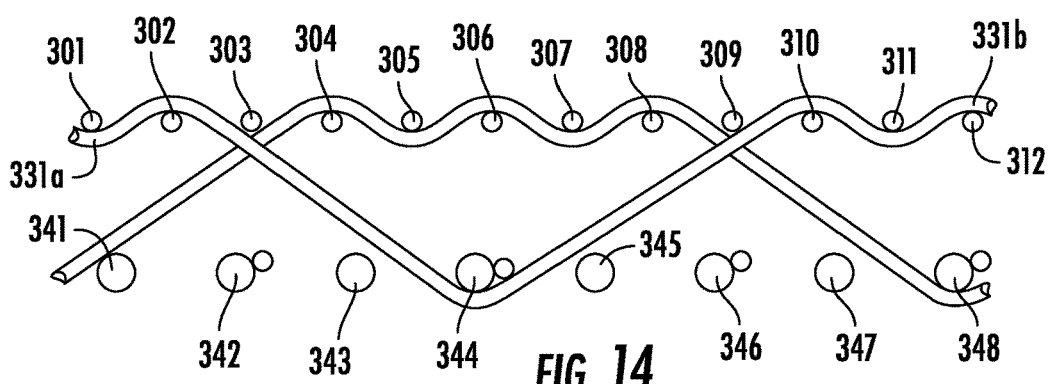
FIG. 14 is a section view of a typical pair of stitching yarns of the fabric of FIG. 11.

In its fiber support portion, each stitching yarn 331a, 331b-334a, 334b passes over top MD yarns that the adjacent top CMD yarns pass beneath and under the top MD yarns that the adjacent top CMD yarns pass over. For example, and as shown in FIG. 14, the fiber support portion of stitching yarn 331a passes over top MD yarns 302, 310 and 312 while passing under top MD yarns 301 and 311, and stitching yarn 331b passes over top MD yarns 304, 306 and 308 while passing below top MD yarns 305 and 307. Both stitching yarns 331a, 331b pass below the transitional top MD yarns 303, 309. The remaining stitching yarn pairs weave in a similar manner, although they are offset from adjacent stitching yarn pairs in a double broken twill pattern. In this manner, the stitching yarns 331a, 331b-334a, 334b and the top CMD yarns 321-326 form a plain weave pattern with the top MD yarns 301-312 (see FIG. 11).

Figure 12:
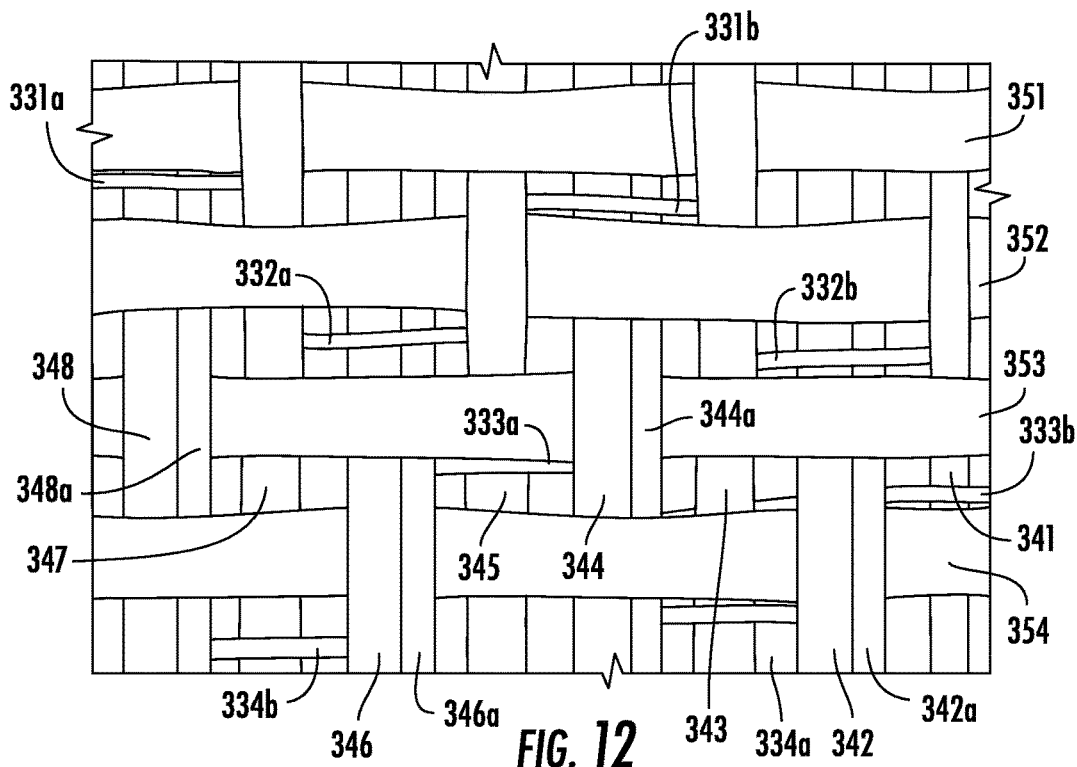
FIG. 12 is a bottom view of the fabric of FIG. 11.
Figure 15:
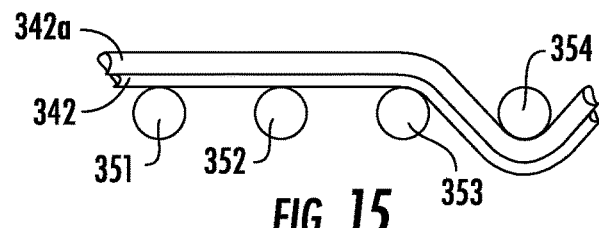
FIG. 15 is a section view of a typical bottom MD yarn and auxiliary bottom MD yarn of the fabric of FIG. 11.

Turning now to FIGS. 12 and 15, the bottom surface of the fabric is shown therein. The bottom MD yarns 341-348 interweave with the bottom CMD yarns 351-354 in an "over 3/under 1" pattern (note that FIG. 12 is a bottom view of the fabric 300 and is opposite the view of FIG. 11, so the description of the bottom MD yarns passing "over 4" bottom CMD yarns is consistent with the "over" and "under" conventions adopted with respect to FIGS. 11 and 13-15 rather than the view seen in FIG. 12). For example, bottom MD yarn 342 passes over bottom CMD yarns 351-353 and under bottom CMD yarn 354 (see FIG. 15). The remaining bottom MD yarns follow a similar pattern, with each bottom MD yarn being offset from its adjacent bottom MD yarns in a double broken twill pattern.

The auxiliary bottom MD yarns 342a, 344a, 346a, 348a are woven with the bottom CMD yarns 351-354 in an "over 3/under 1" sequence. Each "under 1" knuckle of the auxiliary bottom MD yarns aligns with the "under 1" knuckle of a paired adjacent bottom MD yarn. For example, auxiliary bottom MD yarn 342*a* forms a knuckle under bottom CMD yarns 352, which are the same bottom CMD yarn under which paired bottom MD yarn 342 forms a knuckle (see FIG. 15). The remaining auxiliary bottom MD yarns similarly form knuckles aligned with their adjacent bottom MD yarns.

Also, the binding portion of each of the stitching yarns 331*a*, 331*b*-334*a*, 334*b* is stitched below one bottom MD yarn, with the stitching yarns of a pair stitching below bottom MD yarns that are separated by three bottom MD yarns. For example, as shown in FIG. 14, stitching yarn 331*a* passes below bottom MD yarn 348 (and auxiliary bottom MD yarn 348*a*), and stitching yarn 331*b* passes under bottom MD yarn 344 (and auxiliary bottom MD yarn 344*a*). Adjacent pairs of stitching yarns are offset from each other in a double broken twill pattern.

Those of skill in this art will recognize that the total of six top CMD yarns, four CMD stitching yarn pairs, and four bottom CMD yarns forms a 5:2 ratio of effective top CMD yarns (i.e., number of top CMD yarns+number of stitching yarn pairs) to bottom CMD yarns (i.e., number of bottom CMD yarns). This ratio, which is discussed in, for example, U.S. Pat. No. 8,196,613 to Ward, can provide fabrics with an excellent balance of properties including permeability, fiber support, stability and wear volume. In particular, CMD fiber support may be improved over fabrics with a 2:1 ratio because there are more top CMD yarns per inch. In some embodiments a 5:3 ratio may also be employed.

Those skilled in this art will appreciate that yarns of different sizes may be employed in fabric embodiments of the present invention. For example, the top MD yarns, top CMD yarns, auxiliary bottom MD yarns, and stitching yarns may have a diameter of between about 0.10 and 0.20 mm, the bottom MD yarns may have a diameter of between about 0.18 and 0.40 mm, and the bottom CMD yarns may have a diameter of between about 0.20 and 0.50 mm. The mesh of fabrics according to embodiments of the present invention may also vary. For example, the mesh of the top surface may vary from about 20×30 to 30×50 (epcm to ppcm), and the total mesh may vary between about 60×45 to 90×75. More specifically, yarns for the fabrics 100, 200 may be selected as set forth in Table 1:

TABLE 1

| Yarn type | Size (mm) |
|---|---|
| Top MD Yarn | 0.16 |
| Top CMD Yarn | 0.17 |
| CMD Stitching Yarns | 0.19 |
| Bottom MD Yarns | 0.34 |
| Auxiliary Bottom MD Yarns | 0.16 |
| Bottom CMD Yarns | 0.48 |

Parameters of a specific embodiment of the fabric 300 of FIGS. 11-15 are set forth in Table 2.

TABLE 2

| Property | XTD-775 |
|---|---|
| Weave Pattern: | 1 × 1/4HS |
| Yarn Ratios (md × cmd): | 1:1 (special) × 5:2 |
| MD Sizes (mm): | .16/.34 |
| CD Sizes (mm): | .17/.19/.48 |
| PS Mesh (epi × ppi): | 55 × 62 |
| PS Mesh (epcm × ppcm): | 21.7 × 26.0 |

TABLE 2-continued

| Property | XTD-775 |
|---|---|
| Permeability (cfm): | 450 |
| MD Fiber Support Index: | 36 |
| CD Fiber Support Index: | 83 |
| Total Fiber Support Index: | 119 |
| Top Open Area (%): | 37.0 |
| Caliper (mm): | 1.20 |
| GB Stretch (%): | 0.29 |
| Delta 100 (%): | 0.62 |
| Burial (mm): | 0.243 |
| Skew (mm): | 24 |
| Wear Volume (mm$^3$/cm$^2$): | 9.7 |
| CMD Stiffness (TSU): | 153 |

Figure 16:
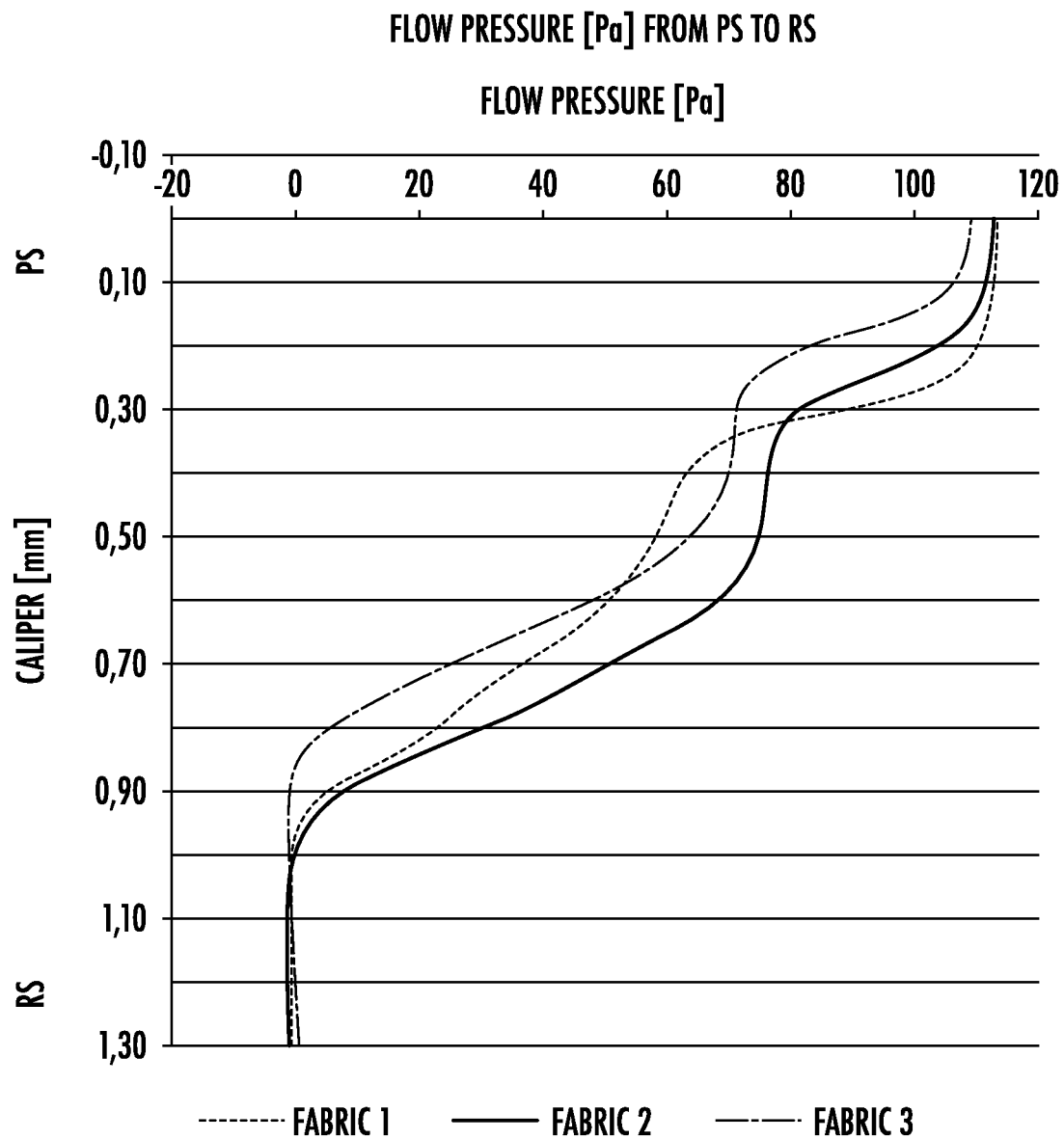
FIG. 16 is a graph plotting flow resistance as a function of fabric depth for three different fabrics.

The weave patterns of fabrics 100, 200, 300 can create engineered drainage channels of the type described in Baumann, supra, and can do so in fabrics with more yarns having the size of top MD yarns (i.e., either top MD yarns or auxiliary bottom MD yarns) than main bottom MD yarns. Doing so can reduce the paper-side MD yarn count relative to the machine-side MD yarn count (while maintaining or increasing the paper-side CMD yarn count), thereby increasing the paper-side open area and reducing the machine-side open area to the extent that the drainage channels become more like as described in Baumann—which can improve fabric drainage. As an example, FIG. 16 is a graph showing the flow pressure across the thickness of the fabric. The line labeled "Fabric 3" represents the fabric of FIGS. 11-15 and demonstrates reduced drainage pressure on both the paper side and the machine side of the fabric compared to similar prior fabrics. Also, flow velocity is reduced on the paper side of the fabric.

Also, increased paper-side open area without reducing the paper-side CMD yarn count and/or CMD yarn diameters can maintain or improve surface and internal wear. It improves fabric stability and seam strength potential particularly with long float bottom weaves. It can also significantly increase the design flexibility for MD yarns with paper-side to machine-side MD yarn ratios greater than one.

The form of the yarns utilized in fabrics of the present invention can vary, depending upon the desired properties of the final papermaker's fabric. For example, the yarns may be monofilament yarns, flattened monofilament yarns as described above, multifilament yarns, twisted multifilament or monofilament yarns, spun yarns, or any combination thereof. Also, the materials comprising yarns employed in the fabric of the present invention may be those commonly used in papermaker's fabric. For example, the yarns may be formed of polyester, polyamide (nylon), polyurethane, polypropylene, aramid, or the like. The skilled artisan should select a yarn material according to the particular application of the final fabric. In particular, round monofilament yarns formed of polyester or polyamide may be suitable, and, as noted, the use of monofilament yarns as bottom MD yarns may be particularly suitable.

Although each of the embodiments includes a plain weave top surface, other embodiments may include a top surface having a different weave pattern, including twill, satin, or the like. In addition, the bottom surfaces of the fabrics may take other weave patterns, including satin, twill or the like. Also, additional weave patterns with different numbers and ratios of top and bottom MD and CMD yarns may also benefit from the concepts discussed herein. Further, in some embodiments the stitching yarns may be MD stitching yarns rather than CMD stitching yarns.

Pursuant to another aspect of the present invention, methods of making paper are provided. Pursuant to these methods, one of the exemplary papermaker's forming fabrics described herein is provided, and paper is then made by applying paper stock to the forming fabric and by then removing moisture from the paper stock. As the details of how the paper stock is applied to the forming fabric and how moisture is removed from the paper stock is well understood by those of skill in the art, additional details regarding this aspect of the present invention need not be provided herein.

The foregoing embodiments are illustrative of the present invention, and are not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A papermaker's fabric, comprising a series of repeat units, each of the repeat units comprising:
   - a set of top machine direction (MD) yarns having a first diameter;
   - a set of bottom MD yarns having a second diameter larger than the first diameter;
   - a set of auxiliary bottom MD yarns having the first diameter;
   - a set of top cross machine direction (CMD) yarns interwoven with the top MD yarns to form a top fabric layer;
   - a set of bottom CMD yarns interwoven with the bottom MD yarns and the auxiliary bottom MD yarns to form a bottom fabric layer; and wherein each of the auxiliary bottom MD yarns follows the same weaving sequence with the bottom CMD yarns as an adjacent bottom MD yarn
   - a set of stitching yarns arranged in pairs, wherein at least one of the stitching yarns of the pair interweaves with the top and bottom fabric layers.

2. The papermaker's fabric defined in claim 1, wherein each of the auxiliary bottom MD yarns is interwoven with the bottom CMD yarns such that it forms a knuckle under bottom CMD yarns under which immediately adjacent bottom MD yarns also form knuckles.

3. The papermaker's fabric defined in claim 1, wherein the top MD yarns, the top CMD yarns, and the stitching yarns form a plain weave surface.

4. The papermaker's fabric defined in claim 1, wherein the stitching yarns are CMD stitching yarns.

5. The papermaker's fabric defined in claim 1, wherein the number of top MD yarns is equal to the sum of the number of bottom MD yarns and the number of auxiliary bottom MD yarns.

6. The papermaker's fabric defined in claim 1, comprising equal numbers of top CMD yarns and stitching yarn pairs.

7. The papermaker's fabric defined in claim 1, comprising twice as many top CMD yarns as stitching yarn pairs.

8. The papermaker's fabric defined in claim 1, wherein a ratio of (a) top CMD yarns and stitching yarn pairs to (b) bottom CMD yarns is 5:2.

9. The papermaker's fabric defined in claim 1, wherein both of the yarns of each stitching yarn pair stitch with the bottom MD yarns.

* * * * *

UNITED STATES PATENT AND TRADEMARK OFFICE
CERTIFICATE OF CORRECTION

PATENT NO. : 11,214,923 B2
APPLICATION NO. : 17/018646
DATED : January 4, 2022
INVENTOR(S) : Kevin Ward It is certified that error appears in the above-identified patent and that said Letters Patent is hereby corrected as shown below:

In the Specification

Column 6, Line 9: Please correct "MID" to read -- MD --

Column 6, Line 16: Please correct "over3" to read -- over 3 --

Column 6, Line 30: Please correct "MID" to read -- MD --

Column 7, Line 3: Please correct "MID" to read -- MD --

Column 7, Line 42: Please correct "over7" to read -- over 7 --

Signed and Sealed this
Tenth Day of May, 2022

Katherine Kelly Vidal
*Director of the United States Patent and Trademark Office*